April 25, 1950
R. J. HOPKINS ET AL
2,505,545
CAPACITOR PAPER
Filed Oct. 16, 1944
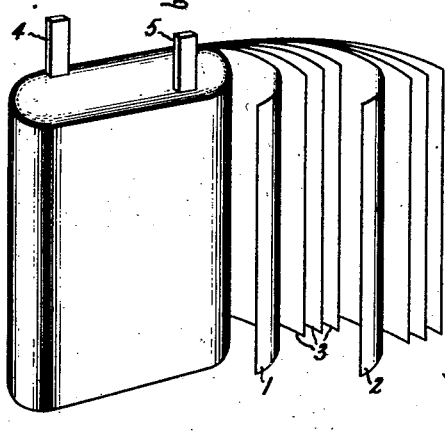
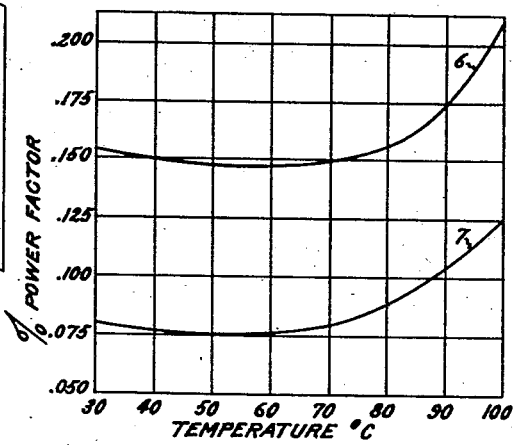
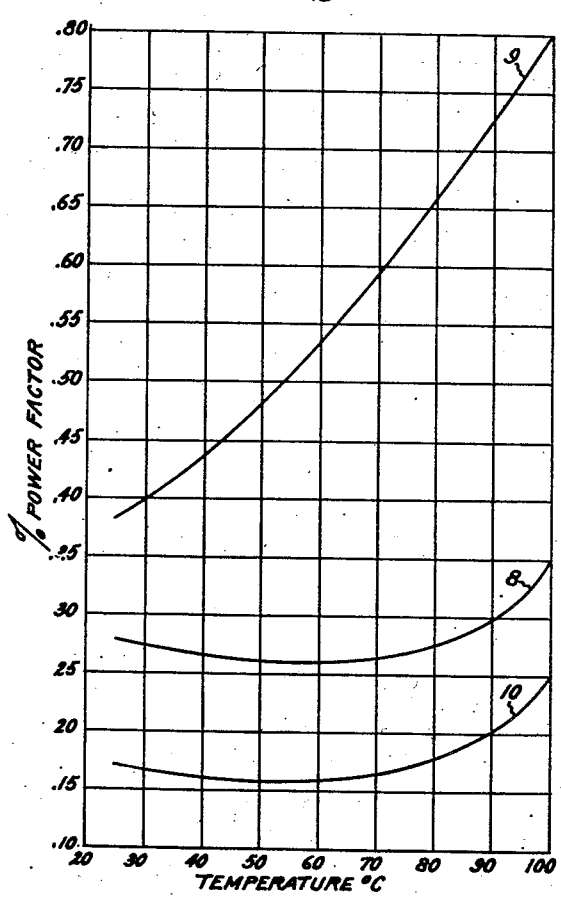
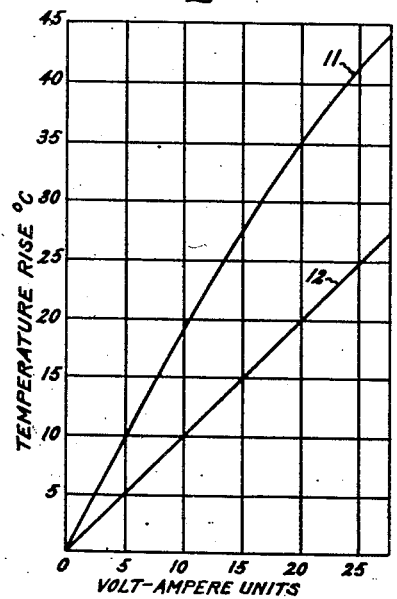
Inventors:
Richard J. Hopkins,
Reavis C. Sproull,
by Harry E. Dunham
Their Attorney.

UNITED STATES PATENT OFFICE 2,505,545

CAPACITOR PAPER

Richard J. Hopkins and Reavis C. Sproull, Pittsfield, Mass., assignors to General Electric Company, a corporation of New York Application October 16, 1944, Serial No. 558,800

2 Claims. (Cl. 175—41)

The present invention comprises an improved dielectric sheet material, and in one of its aspects comprises paper having new characteristics, the per cent power factor in particular being less than one-half as great as formerly attainable. It is the principal object of our invention to produce improved electric capacitors in the structure of which such improved paper forms a part.

In electric capacitors, and especially in large capacitors such as are used in the power factor correction field, paper dielectric spacers should have a required thinness combined with good mechanical properties. For example, the paper should have sufficient tensile strength to permit the machine fabrication of capacitors. Also, capacitor paper in an impregnated state should have high dielectric strength and should operate in capacitors with minimum energy loss.

Energy loss in a capacitor, of course, results in the accumulation of heat therein, the dissipation of which becomes progressively more difficult as the size of the capacitor units increases. The power factor of a dielectric is a measure of energy loss, a low power factor characterizing low energy loss and hence little heating. In other words, the power factor may be looked upon as a loss factor. Should the power factor increase as the temperature rises, the undesirable heat accumulation may result in power factor instability. The temperature would rise until the capacitor is destroyed. As it is desired in the capacitor field to increase the size of capacitor units and to operate with higher ambient temperatures without an increase in internal temperature, a low power factor is essential. Lowering of the power factor of capacitors is constantly the aim of research in the capacitor field. An improvement of even a small fraction of one per cent, particularly at operating temperatures, has important results, as will be shown.

Kraft capacitor paper which is made from wood pulp prepared by the sulphate process, when used in large capacitors operated in the power field, has given satisfactory but limited results. The manufacture of such kraft capacitor paper is described in Allen U. S. Patent 1,850,702, patented March 22, 1932. Such kraft paper when dry has good mechanical properties, high dielectric strength, and a power factor of about 0.15 to 0.25 per cent in a commercial operating temperature range. Although the temperature coefficient or increase of power factor with rise of temperature of such paper usually is moderate, in some cases the coefficient may be so large that the rise of temperature under working conditions has limited the construction and size of the capacitor that can be manufactured from this paper. Kraft paper, as previously prepared, had a density of about 1.0. The density varied with manufacturing conditions within the range of about 0.90 to 1.05.

We have discovered that when wood pulp paper by a suitable treatment of the pulp and fabricating conditions is prepared with a density well below 0.90, the power factor of such low density paper is reduced to one-half or less of the values commonly attainable heretofore. Within a range of 0.80 to 0.60, the power factor of such paper is as low as .060 per cent. Power factor figures stated herein were taken at 60 cycles and at 60° C., but the conclusions drawn are applicable to all commercial frequencies.

Reference to power factor of the paper is on a dry basis and all power factor values are given in per cent.

In the accompanying drawing, Fig. 1 is a side elevation of a roll-type capacitor shown partly unrolled; Figs. 2 and 3 are graphs showing respectively the relation of power factors over a range of temperatures of our improved paper and of capacitors embodying such paper; and Fig. 4 is a graph showing the effect on the operating temperature of capacitors containing low density paper.

For the fabrication of the chemically treated kraft paper embodying the present invention, a sulphate wood pulp is employed. Ordinary kraft pulp first is partially bleached with a buffered bleach solution in order to remove a portion of the lignin. This treatment may be carried out with sodium chlorite at such temperatures and concentration as not to result in any substantial degradation of the cellulose. For example, the temperature may be 25° C., or even lower, and the concentration of the solution may be one per cent or less. The partially bleached stock is given a mild treatment with sufficient dilute alkali, e. g. a four to six per cent sodium hydroxide solution, to reduce the percentage of extractable matter to a desired value. After removing the alkali solution, the pulp is washed with a dilute acid such as acetic acid. The acid is removed by repeated washing with water.

The chemical treatment should be carried out in such a way that the final content of alpha cellulose of the pulp is within the limits of about 91 to 95 per cent, the content of pentosans is about one to five per cent, and the content of lignin is about .5 to five per cent. The ash residue obtained by calcination of the paper should be about .15 to .30 per cent. The permanganate number of the pulp after this treatment should be about five to eight, and a one per cent TAPPI viscosity of 15 to 35 centipoises at 20° C. normally is obtained.

The pulp is converted into paper by the methods described in the Allen patent with some modifications. The Allen patent directs that the pulp is beaten for 36 to 40 hours. In order to produce the low density paper of our invention, the pulp should be beaten for a period of about six to ten hours. The pulp prepared as above-described hydrates more readily than the pulp prepared for the Allen process.

The Allen patent directs that kraft paper therein described should be passed through a supercalender. This calender treatment densifies the paper and gives it a high gloss. The paper made in accordance with our invention, on the contrary, may be used in the condition in which it leaves the paper-making machine. In its preferred form it should not be passed through a supercalender but, to develop a chosen density, it may be calendered very lightly. It does not have a high gloss and is more opaque than paper made by the Allen process.

The finished paper should have a well-matted, non-porous structure and should have a high resistance to the passage of air or other gas under pressure. The resistance to the passage of air of capacitor paper which is made in accordance with our invention is several times greater than the air resistance of prior kraft capacitor paper, which means that our improved paper is less porous. The preferred thickness of the finished paper is about .00035 to .00060 inch. The density of our improved paper is about 0.80 to 0.60. Its power factor is within the limits of about .090 to .060 per cent when measured at 60° in a 60 cycle electric field. Our investigations have shown that there is a definite relation between density and power factor in a paper dielectric material. The lower the density, the lower is the power factor. However, this relation is not linear, the power factor being unexpectedly low in our preferred density range.

In the fabrication of capacitors, one or more sheets of paper are placed between suitable cooperating armatures which commonly consist of suitable metal foil. The assembly is impregnated with a suitable liquid dielectric material. As shown in Fig. 1, a capacitor of the wound type comprises metal foil armatures 1, 2 which may consist of aluminum, between which are placed two or more sheets of paper. The paper spacer is collectively numbered as 3 in the drawing, three sheets being shown. Suitable terminal conductors 4, 5 are provided in contact with the armatures. The foil and paper are wound upon themselves as well understood.

While a variety of impregnants may be used, the advantages of our invention will be illustrated in connection with capacitors impregnated with liquid chlorinated diphenyl. The latter type of impregnant is described in Clark Patent 2,041,594, patented May 19, 1936.

Before further describing the characteristics of capacitors containing our improved low density paper and treated with an impregnant, attention is directed to Fig. 2 of the drawing. In this figure are shown for comparison purposes, in graph form, the power factor expressed in per cent over a range of temperatures of the ordinary kraft paper commonly in use before our invention and the power factor of a low density chemically treated kraft paper embodying our invention. A typical kraft paper has at room temperature a power factor above 0.15 per cent. Curve 6 shows the minimum values heretofore attainable rather than average values. The power factor slightly decreases as the temperature rises to about 60°, and then increases with rise of temperature. At 100° C., the minimum power factor shown in the graph is about .220 per cent.

As shown by curve 7, a typical paper made in accordance with our invention may have an initial power factor of about .075 per cent. As the temperature rises to about 60°, the power factor decreases somewhat. The power factor also rises with further increase of temperature, but even at temperatures above 100° C. the power factor of our improved paper is less than the minimum power factor of the ordinary kraft paper. In the example chosen, it is .125 per cent at 100° C. More favorable results are attainable, the values plotted being average values.

In Fig. 3, the area between curves 8 and 9 shows the range of percent power factor values of capacitors containing spacers of ordinary capacitor paper and being impregnated with chlorinated diphenyl. Capacitors containing our improved paper and being also impregnated with chlorinated diphenyl have a lower power factor characteristic than the minimum heretofore attainable. A typical power factor-temperature relation of the latter capacitors is illustrated by curve 10.

In Fig. 4, curve 11 indicates the dielectric temperature of capacitors for a range of operating ratings. The values are plotted for a chosen typical capacitor consisting of aluminum foil spaced with six sheets of ordinary capacitor paper having a thickness of .00055 inch.

In the same figure is plotted as curve 12 the characteristics of a similar capacitor consisting of aluminum foil spaced with six sheets of low density, chemically modified kraft paper having a thickness of .00055 inch. A temperature rise of 28° C. was observed when the capacitor containing the ordinary kraft was operated at normal voltage with a 15 unit volt-ampere loading in an ambient temperature of about 30° C. The capacitor provided with the low density chemically modified kraft paper and otherwise having the same construction and also being impregnated with chlorinated diphenyl with the same loading gave a temperature rise of only 15.5° C.

When two capacitors of the conventional type are operated at an excess load of 65 per cent, the temperature rise of the capacitor containing conventional kraft paper is 60 per cent greater than the temperature rise of the improved capacitor embodying our invention. This is shown by a comparison of curves 11 and 12.

Capacitors containing our improved paper as a spacer, when impregnated with mineral oil, or any other impregnant, show similar advantageous results. That is, the operation is accompanied by less temperature rise than accompanies the operation of a capacitor containing conventional kraft capacitor paper. Another advantage ascribable to the modified kraft paper is that the corona level of capacitors containing such paper is higher by 20 per cent than the corona level of capacitors containing conventional dielectric paper.

If it is assumed that the operating dielectric temperature of an electric capacitor is to be restricted to a given maximum, then it follows that a capacitor containing the low density paper embodying our invention is suitable for operation in an environment in which the ambient temperature is considerably higher than the ambient temperature in which a capacitor containing ordinary kraft paper may be operated. For example, as shown by Fig. 4, a capacitor containing the chemically treated kraft paper (represented by graph 12) has a temperature rise at normal voltage (15 units) of 13 degrees less than a capacitor similarly constructed of ordinary kraft paper (represented by graph 11), and is, therefore, suitable for operation in a 13° C. higher ambient temperature.

Assuming a given capacitor rating, capacitors embodying our invention may have a smaller surface for a given volt-ampere unit loading than capacitors which contain conventional kraft paper and are otherwise similar. For this reason, capacitors of more economic construction for any desired volt-ampere rating may be provided.

What we claim as new and desired to secure by Letters Patent of the United States is:

1. A wood pulp paper which is suitable as a dielectric medium in electric capacitors and having a density of about 0.75 to 0.60 and containing about 91 to 95 per cent cellulose, one to five per cent pentosans, .5 to 5.0 per cent lignin, and .15 to .30 per cent ash residue, and having a power factor within a range of about .085 to .060 per cent at 60° C. in a 60 cycle electric field.

2. An electric capacitor comprising cooperating armatures, a plurality of sheets of paper therebetween, said paper having a density of about 0.60 to 0.80, a power factor no greater than about .085 per cent at 60° C. in a 60 cycle field and being prepared from kraft pulp containing about 91 to 95 per cent cellulose, about one to five per cent pentosans, about .5 to 5.0 per cent lignin and having an ash content of about 0.15 to 0.30 per cent and a liquid dielectric material permeating said paper.

RICHARD J. HOPKINS.
REAVIS C. SPROULL.

REFERENCES CITED

The following references are of record in the file of this patent:

UNITED STATES PATENTS

| Number | Name | Date |
|---|---|---|
| 1,850,702 | Allen | Mar. 22, 1932 |
| 2,007,792 | Clark | July 9, 1935 |
| 2,041,666 | Richter | May 19, 1936 |

FOREIGN PATENTS

| Number | Country | Date |
|---|---|---|
| 23,796 | Denmark | Nov. 16, 1918 |
| 116,594 | Australia | Mar. 4, 1943 |
| 506,361 | Great Britain | May 26, 1939 |

OTHER REFERENCES

Chemical Abstracts, volume 33, page 56555.

Paper Industry and Paper World, Nov. 1940, pages 792 to 796.

The Electrician, Apr. 12, 1929, pages 441 and 442.

Industrial and Engineering Chemistry, July 1939, pages 809 to 813.